Patented Oct. 31, 1944

2,361,373

UNITED STATES PATENT OFFICE 2,361,373

METAHYDROXYBENZYLMETHYLCARBINA-MINES AND MEDICINAL PREPARATIONS COMPRISING THE SAME

Gordon A. Alles, Los Angeles, Calif.

No Drawing. Application July 5, 1938,
Serial No. 217,584

5 Claims. (Cl. 260—570.8)

This invention relates to a new composition of matter, and more particularly a synthetic organic compound, and to a medicinal preparation comprising such compound.

This application is a continuation-in-part of my application Serial No. 167,414, filed October 5, 1937, which has become abandoned.

The principal object of this invention is to provide a new composition of matter which may be used as an intermediate in the synthetic production of compounds useful for therapeutic purposes, or may itself be used as a medicinal preparation in the therapeutic treatment of animals and man.

A particular object of the invention is to provide a new and useful medicinal preparation for use in the treatment of animals and man.

The new composition in accordance with this invention will be found to have various uses as a medicinal preparation, and from the standpoint of its therapeutic characteristics, will be found effective for various purposes and particularly for acting upon muscles and glands that are innervated by the sympathetic nervous system in the same way that stimulation of this nervous system acts upon these muscles and glands. Thus, for example, when applied locally or systemically, it will constrict the small blood vessels, stimulate the heart, relax the bronchi and intestines, or dilate the pupil of the eye, in ways that may be in some respects likened to those of epinephrine when acting upon these organs.

This new composition as a medicinal preparation in accordance with this invention may be employed in various forms and may be variously administered. Thus, for example, it may be used in liquid solution forms, or in solid form such as in powders or tablets, alone or with other agents as desired, and it may be variously administered as, for example, into the nose, mouth or gastrointestinal tract, or by intravenous or subcutaneous injection.

Broadly speaking, the new composition in accordance with this invention comprises a metahydroxybenzylmethylcarbinamine from the group consisting of a base and the salts thereof, said base having the formula:

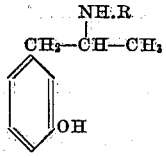

wherein R represents a member of the group consisting of hydrogen and a methyl radical. A specific embodiment of the invention comprises metahydroxybenzylmethylcarbinamine or a salt thereof, and another specific embodiment comprises metahydroxybenzylmethylcarbinmethylamine or a salt thereof. In either of these embodiments, the salts may be, for example, hydrochlorides, sulfates, oxalates, tartrates, etc.

It will be understood that by reference to a metahydroxybenzylmethylcarbinamine, in the following descriptions and claims, it is contemplated and intended that such term include from the broad standpoint, metahydroxybenzylmethylcarbinamine itself, the N-methyl derivative thereof, salts thereof, and salts of the N-methyl derivative.

The new composition of matter in accordance with this invention may be prepared in any desired manner, no claim to any particular method of preparation being made.

For example, a metahydroxybenzylmethylcarbinamine in accordance with this invention may be prepared by demethylation of the corresponding metamethoxybenzylmethylcarbinamine having the formula:

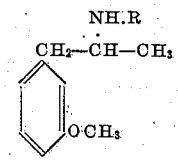

wherein R represents a member of the group consisting of hydrogen and a methyl radical, methods of preparation of which are fully described in my copending patent application Ser. No. 217,583, filed concurrently herewith.

By way of illustrating suitable methods for the preparation of a new composition in accordance with this invention, a description of certain preparative methods and their specific products is herewith detailed:

*Metahydroxybenzylmethylcarbinamine.*—This substance is very conveniently prepared by demethylation of metamethoxybenzylmethylcarbinamine by use of a concentrated hydrobromic acid solution. One-tenth gram-mol of metamethoxybenzylmethylcarbinamine is dissolved in one-tenth liter of 48% hydrobromic acid and heated to boiling under a reflux condenser for four hours and then the excess hydrobromic acid distilled off. Addition of some water, and then sodium carbonate, to the residue causes separation of a semi-solid precipitate which is taken up with butanol. Evaporation of the butanol and treatment of the residue with benzene gives a solid metahydroxybenzylmethylcarbinamine base which melts at 120° C.

*Metahydroxybenzylmethylcarbinamine salts.*—The hydrochloride and neutral sulfate are readily prepared by treating the amine with an equivalent of hydrochloric or sulfuric acid but these salts appear extremely hygroscopic and are not readily obtained in solid form. A definite salt appears to be formed from equal molal amounts of the amine and phosphoric acid but this acid phosphate is also not readily obtained in solid form. The tartrate is prepared as a crystalline salt by mixing equal molal amounts of the amine and dextrotartaric acid dissolved in ethanol, followed by addition of ether, and the bitartrate so obtained melts at 160–161° C.

*Metahydroxybenzylmethylcarbinmethylamine.*—This substance is prepared from the corresponding metamethoxybenzylmethylcarbinmethylamine by treatment with concentrated hydrobromic acid solution. One-twenty-fifth gram-mol metamethoxybenzylmethylcarbinmethylamine is dissolved in one-tenth liter 48% hydrobromic acid and the mixture heated to boiling for four hours and then the excess hydrobromic acid distilled off. Addition of some water, and then sodium carbonate, liberates a basic layer which is then taken up with amyl alcohol. After drying the amyl alcohol extract of the base with more sodium carbonate, it is evaporated to a small volume and considerable anhydrous ether added. On standing in the refrigerator for some time, solid crystals of metahydroxybenzylmethylcarbinmethylamine come out and these melt at 118–120° C.

*Metahydroxybenzylmethylcarbinmethylamine salts.*—The sulfate is readily prepared by exact neutralization of the amine with an equivalent of sulfuric acid but is difficult to obtain as a solid because of its great avidity for taking up water from the air. By preparing the sulfate in absolute ethanol and addition of absolute ether a solid preparation may be obtained, but transference to a melting point tube permits water absorption so the melting point is not readily determinable. A solid bitartrate salt may be obtained by reacting equal molal amounts of amine and dextrotartaric acid in ethanol solution, followed by addition of ether, yielding a semi-solid and this on placing under a vacuum in a desiccator yields a solid, very hygroscopic bitartrate.

As an example of the use of the composition of this invention as an intermediate in the synthetic production of other organic compounds, any of the embodiments thereof may be methylated by known processes to yield the corresponding quaternary ammonium salt, such as metahydroxybenzylmethylcarbintrimethylammonium iodide.

In using the broad and specific embodiments of this invention as medicinal preparations, the bases or salts of the bases may be dissolved in water or other desired solvent, or mixed with liquid compositions, and applied locally by tampon or spray. Or, by way of another example, the bases or salts of the bases may be dissolved in an alcohol elixir for oral administration to affect the circulation or to act more generally to simulate sympathetic nerve stimulation and results therefrom. Again, for example, a solid form may be prepared by tableting the salts of the bases alone or together with an agent like lactose and the tablets administered into the mouth or, after solution in water, by hypodermic injection.

The proportion of the bases or salts of the bases in the medicinal preparations, and the nature and proportions of other ingredients used, are subject to wide variation, according to the therapeutic effect to be attained and the method in which the preparation is to be administered. The bases or salts may be dissolved in or mixed with any suitable excipient, and the proportion of the bases or salts of the bases may be any proportion which is sufficient to impart effective therapeutic properties to the preparation. It may be as low as 1% or even less when used in solution, or as much as 50% or even as high as 90% in other cases, as when used in solid tableted form. The pure bases or salts of the bases may be used alone to give certain therapeutic effects, although it is often preferable to add other constituents, as solvents or diluents, to impart desired physical properties, perfume, color, or the like to the liquid or solid preparation. Thus, a medicinal preparation in accordance with this invention may comprise the designated bases or salts, alone or together with a suitable excipient.

By way of illustrating suitable proportions of active ingredient and forms of a medicinal remedy in accordance with this invention, description of some such medicinal products are herewith detailed, in which the bases or their salts are mixed with other suitable ingredients as excipients.

Aqueous solutions for topical application to eye or nasal membranes are prepared by dissolving 1.00 g. metahydroxybenzylmethylcarbinamine in 100 cc. of water saturated with boric acid, this water solution serving as an effective sterile diluting agency for the therapeutically active base.

Sterile ampule vials containing dry metahydroxybenzylmethylcarbinmethylamine sulphate for preparation of solutions for parenteral injections are filled with 20 mg. of the pure salt, or with a mixture of 20 mg. of the pure salt and 9 mg. of sodium chloride, so that on use by addition of 1.0 cc. sterile water a solution physiological in sodium chloride content is obtained.

Elixirs for oral administration of the salts of the bases are well prepared by dissolving 5 g. of the desired salt in 100 cc. water and adding 125 cc. ethanol, 10 cc. of lemon flavor concentrate and 765 cc. of 60% simple sucrose syrup, which may be tinted with a certified dyestuff.

Tablets for hypodermic solution preparations are made as triturate tablets of 50 mg. metahydroxybenzylmethylcarbinamine bitartrate without admixture of any other substance, while tablets for oral administration are prepared by compressing a granulated mixture of 20, 50 or 100 mg. of the same compound with 180, 150 or 100 mg. respectively of lactose which may, if desired, be flavored with a trace of saccharin or similar substance.

I claim:
1. A metahydroxybenzylmethylcarbinamine of the group consisting of metahydroxybenzylmethylcarbinamine and salts thereof.
2. Metahydroxybenzylmethylcarbinamine.
3. A salt of metahydroxybenzylmethylcarbinamine.
4. Metahydroxybenzylmethylcarbinamine bitartrate.
5. Metahydroxybenzylmethylcarbinamine sulfate.

GORDON A. ALLES.